Oct. 16, 1928.
H. D. MATTHEWS
CONTROL DEVICE
Filed Sept. 12, 1925
1,687,680
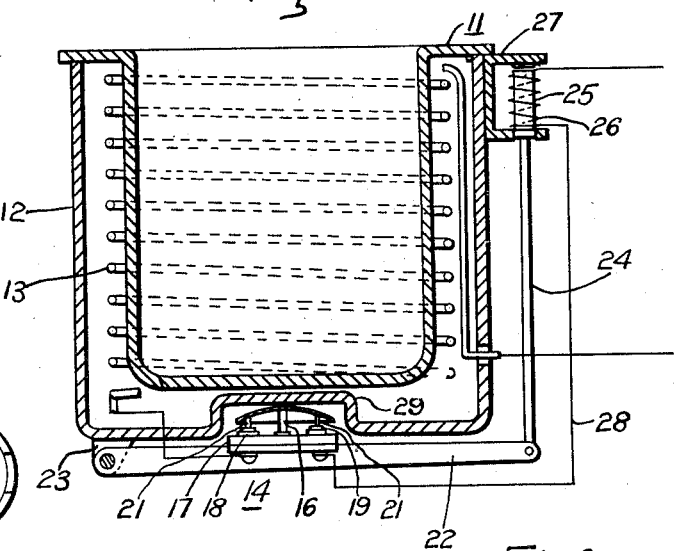
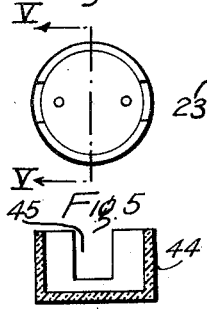
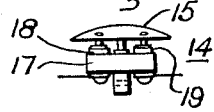
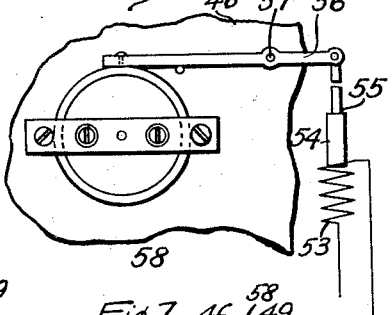
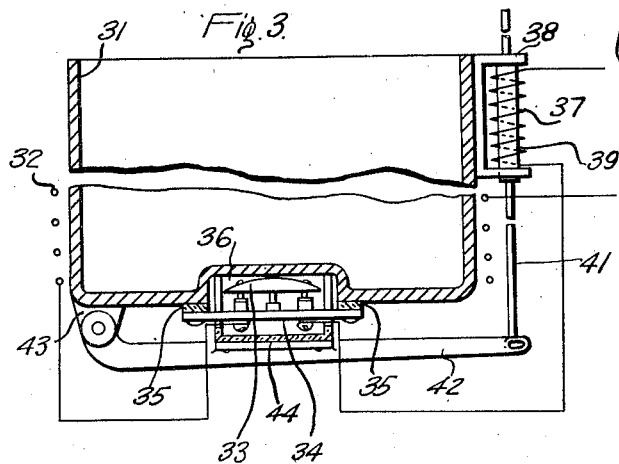
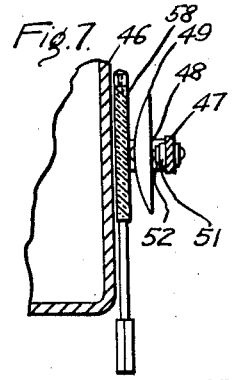
WITNESSES:
INVENTOR
Howard D. Matthews
BY
ATTORNEY Patented Oct. 16, 1928.

1,687,680

UNITED STATES PATENT OFFICE.

HOWARD D. MATTHEWS, OF MANSFIELD, OHIO, ASSIGNOR TO WESTINGHOUSE ELECTRIC & MANUFACTURING COMPANY, A CORPORATION OF PENNSYLVANIA.

CONTROL DEVICE.

Application filed September 12, 1925. Serial No. 55,907.

My invention relates to electrically heated devices and particularly to temperature control means therefor.

One object of my invention is to provide a relatively simple and efficient temperature control means for an electrically heated device.

Another object of my invention is to provide a thermally influenced control means that shall embody means for varying the heat-interchanging relation between the control means and the heated device.

In practicing my invention, I provide a thermal element, a circuit interrupting device actuated thereby, and means controlled by the operation of the thermal element for varying the amount of heat received by the thermal element.

In the single sheet of drawings,

Figure 1 is a view in vertical section of an electrically heated appliance embodying my invention, Fig. 2 is a fragmentary view illustrating particularly a thermal control device, Fig. 3 is a view, in vertical section, of an electrically heated device and a modified form of device embodying my invention, Fig. 4 is a top plan view of a heat insulating member comprising a part of the device illustrated in Fig. 3, Fig. 5 is a section through the device illustrated in Fig. 4, taken on line V—V thereof, Fig. 6 is a fragmentary view in side elevation of still another modification of device embodying my invention, and Fig. 7 is a sectional view laterally therethrough.

Referring more particularly to Fig. 1 of the drawing, a solder pot designated by the numeral 11, is mounted within a suitable outer casing 12. The two members may be both made of metal and while they are here illustrated as substantially circular in horizontal section, they may be of any suitable or desired contour and relative dimensions.

Heating means for the appliance comprises a substantially helically wound resistor member 13, that is indicated schematically only in the drawing as surrounding the inner container 11. Any suitable or desired means for supporting the heating element may be provided, and as the particular construction thereof forms no part of the present invention, I have not described or illustrated it in detail.

Means for controlling the temperature of material located within the inner container 11 and heated therein by the electric heating element 13, comprises a thermostatic switch assembly that is designated generally by the numeral 14, and is shown in end elevation in Fig. 2 of the drawing. The assembly 14 comprises a bi-metallic disc 15 that is suitably supported centrally thereof on a pin or stud 16 that has its other end mounted in a supporting bar 17 that may be made of a suitable electric-insulating material. A plurality of sets of fixed contact members 18 and 19 are mounted in spaced relation on the bar 17 adjacent to the two ends thereof.

Contact bridging members 21 are supported by and insulated from the bi-metallic disc 15 in such position that they operatively engage the spaced sets of fixed contact members 18 and 19 so long as the temperature of the disc is below a predetermined value. The particular construction of the thermostatic disc 15 and of the cooperating contact and bridging members forms no part of my invention and for a clearer understanding thereof, reference may be had to Spencer Patent No. 1,448,240 of March 13, 1923.

The member 17 is suitably mounted on the top surface of a lever 22 that has one of its ends pivotally mounted on a lug 23 that depends from the outer container 12. The other end thereof is pivotally connected to a link member 24, the upper end of which is secured to a magnetizable core member 25 that is located in operative relation to a coil 26. The coil 26 may be suitably mounted in a supporting frame 27, here shown schematically only, which is secured against the outer surface of the container 12.

The ends of suitable supply circuit conductors (not shown) are connected, respectively, to one end of the winding 26, the other end of which is connected by a conductor 28 to one of the fixed contact members 19. The fixed contact member 18 is connected to one end of the heating element 13, the other end thereof being connected to the other supply circuit conductor.

In order to insure that the temperature gradient or the temperature drop from the material within the inner container 11 to the bi-metallic disc 15 shall be as small as possible, I may provide the bottom of the container 13 with an inwardly projecting portion 29 providing a depression in the lower surface within which the thermostatic switch assembly, and particularly the bi-metallic element 15, may be normally located.

Figure 3 of the drawings illustrates a modified form of device embodying my invention, only an inner container 31 being illustrated, although it may be employed with an outer container, such as was hereinbefore described in connection with Fig. 1 of the drawing, for heat-insulating purposes. A heating element 32 is provided, that is of substantially the same construction as hereinbefore described in connection with the heating element 13. A bi-metallic disc member 33 is mounted on a substantially fixed bar 34, of electric-insulating material, which bar is suitably secured against the bottom surface of the container 31, spacing blocks 35 being employed, if necessary, to insure the proper location of the disc 33 within a depression 36 in the bottom surface of the container.

A coil 37 is mounted in a suitable supporting member 38 that may be secured against the outer surface of the container 31, a coil 37 being adapted to energize a magnetizable core member 39 that is operatively associated therewith. The core member 39 has a link member 41 connected thereto, the lower end of which is pivotally connected to a lever member 42, the other end of which is pivotally mounted on a depending lug 43 secured to or constituting a part of the container 31.

A heat-insulating member 44 that is of substantially circular section is mounted on the lever 42 in such position as to normally surround the thermostatic switch assembly substantially as shown in Fig. 3 of the drawing. The member 44 may be made of any suitable heat-insulating material, such as asbestos lumber, and is provided with two diametrically opposed recesses 45 in the side walls thereof within which the supporting bar 34 is normally located.

Figs. 6 and 7 illustrate a still further modification, a casing being indicated by the numeral 46 and being shown in part only. A supporting bar 47 is secured thereagainst and spaced therefrom by suitable spacing blocks 48. A bi-metallic disk member 49 is supported by the bar 47 and a plurality of cooperating contact members 51 and contact bridging members 52 are provided on the bar and on the disc respectively, in substantially the same manner as hereinbefore described in connection with the device illustrated in Fig. 1 of the drawing.

A coil 53 is provided and is suitably supported by means (not shown) against the outer surface of the container 46 and is adapted to energize a magnetizable core member 54. The core member 54 is connected to a link member 55 that has its upper end pivotally connected to a lever 56, which is pivotally mounted intermediate its ends on a suitable support 57 that may be carried by the container 46. The other end of the lever 56 has a disc 58 of heat-insulating material, such as asbestos lumber, secured thereto.

Referring more particularly to the device illustrated in Fig. 1 of the drawing, I have there shown the same as in its normally energized position. Current traverses the winding 26 and the heating element 13. The core member 25 is energized by the winding 26 and will occupy substantially the position illustrated in Fig. 1 of the drawing, whereby the lever 22 will be in its raised position and the bi-metallic disc 15 will be located relatively closely to the portion 29 of the container 13, whereby the heat interchanged between the inner container 11, or more particularly, the material therein, and the bi-metallic disc will be a maximum.

At a predetermined temperature, the bi-metallic disc will be actuated to interrupt the current circuit normally existing between the spaced contact members 18 and 19, thereby interrupting the circuit through the heating element 13. That is, the bi-metallic disc 15 will change its shape in such manner that the contact bridging members 21 will no longer be in engagement with the contact terminals 18 and 19.

When this occurs, the circuit through the winding 26 will also be interrupted, the core member 25 is deenergized and permitted to drop, whereby the lever 22 is also permitted to fall through a predetermined and limited distance. This causes the bi-metallic disc 15 in particular, and the entire thermostatic switch assembly in general, to be moved away from the lower container and from the inner container and the heated material located therein. When the switch assembly is thus located farther away from the heated appliance, its temperature will drop more quickly than would be the case if it were to remain in its original and normal operative position.

This difference in location results in a quicker reclosing of the circuit by reason of the return of the bi-metallic disc 15 to substantially the position illustrated in Fig. 1 of the drawing, wherein the circuit is again closed through both the winding 26 and the heating element 13. This operating characteristic is of especial importance where relatively high temperatures are to be controlled as it is impossible to locate a thermally influenced controlling means in very close heat receiving relation relatively thereto, because the temperature of the heated material would vary through a relatively large range of value before the temperature to which the thermal control means is subjected has varied through a sufficient amount to cause the thermal means to be properly actuated to control the circuit.

Referring more particularly to Fig. 3 of the drawing, the heat insulating member 44 is normally held in substantially the position illustrated in Fig. 3, whereby there will be a relatively small amount of heat radiated from the thermostatic switch assembly which would tend to reduce its temperature. Upon operation of the bi-metallic disc 33 to interrupt the circuit through the heating element and through the winding 37, the core member 39 is de-energized and permitted to fall, whereby the lever 42 is also permitted to drop and the heat-insulating member 44 will be moved away from its normal position around the themostatic switch assembly. This arrangement permits the bi-metallic disc 33 to cool rapidly and to follow more quickly the changes of temperature of the material in the container 31 and the general result will be that the circuit is de-energized and energized more frequently than would otherwise be the case, whereby the temperature of the heated material in the container 31 will be maintained at a more uniform temperature than would otherwise be the case.

Referring more particularly to Figs. 6 and 7, the parts of the device are there illustrated as in the de-energized position. The disc 58 of heat insulating material is shown as being located between the container 46 and the bi-metallic disc 49, to which position it has been permitted to move by reason of the de-energization of the core member 54 upon interruption of the circuit through the winding 53 and through a heating coil (not shown).

The operation of the devices illustrated in the various figures of the drawing is substantially the same in every case and in general, embodies means for varying the heat interchanging relation between the thermostat and the heated device. Electromagnetic means is controlled by the thermostat or thermally influenced means for affecting such variation in the heat interchanging relation between the two members.

Various modifications may be made in the device embodying my invention without departing from the spirit and scope thereof and all such modifications are intended to be covered by the appended claims.

I claim as my invention:

1. In a thermal control system for a heated device, the combination with an electric resistor for heating said device, and a thermostatic switch for controlling the energization of said resistor, said switch being responsive to the temperature of the heated device, of means controlled by the thermostatic switch for reducing the heat flow thereto from the heated device when the resistor is deenergized and for increasing said heat flow upon reenergization of the resistor.

2. The combination with a body to be heated, an electric resistor for heating said body, and a thermostatic switch for controlling the energization of said resistor, of means for causing said switch to be subjected to the temperature of the body to be heated only upon the energization of said resistor.

3. The combination with a body to be heated, electric heating means therefor, and a thermostatic switch responsive to a predetermined temperature of said body for deenergizing said resistor, of means controlled by said switch for substantially preventing the flow of heat from the body to said switch only when the resistor is deenergized and for automatically subjecting said switch to the temperature of said body upon the reenergization of said resistor.

4. The combination with a resistor, a body to be heated thereby, and a thermostatic switch subjected to the temperature of said body for so controlling the energization of the resistor that a substantially constant temperature is maintained in the body, said switch being adapted to deenergize the resistor when a predetermined temperature of the body is attained and to reenergize the same when its temperature has fallen to a predetermined value, of a magnet coil and means actuated thereby for thermally insulating said switch from the body only when the resistor is deenergized.

In testimony whereof, I have hereunto subscribed my name this 17th day of Aug., 1925.

HOWARD D. MATTHEWS.